United States Patent [19]

Hessler et al.

[11] Patent Number: 4,624,718

[45] Date of Patent: Nov. 25, 1986

[54] POLYESTER-POLYAMIDE TAPE INSULATED MAGNET WIRE AND METHOD OF MAKING THE SAME

[75] Inventors: John D. Hessler, Payne, Ohio; Harry E. Eloph, Jr., Fort Wayne, Ind.

[73] Assignee: Essex Group, Inc., Fort Wayne, Ind.

[21] Appl. No.: 796,469

[22] Filed: Nov. 8, 1985

[51] Int. Cl.$^4$ .................... H01B 13/06; B32B 31/00
[52] U.S. Cl. ........................ 156/56; 156/53; 156/273.9; 427/45.1; 427/46
[58] Field of Search ............ 156/53, 56, 273.9; 427/45.1, 46; 428/377

[56] References Cited

U.S. PATENT DOCUMENTS

| | | | |
|---|---|---|---|
| 2,691,694 | 10/1954 | Young | 174/121 |
| 2,734,934 | 7/1954 | McKnight | 174/121 |
| 3,866,316 | 2/1975 | Takechi et al. | 29/605 |
| 4,045,611 | 8/1977 | Torgerson | 174/121 |
| 4,051,324 | 9/1977 | Anderson et al. | 156/56 X |
| 4,159,920 | 7/1979 | Anderson et al. | 156/54 |
| 4,186,041 | 1/1980 | Gantts et al. | 156/53 |
| 4,197,348 | 4/1980 | Townsend | 428/377 |
| 4,443,658 | 4/1984 | Seguin | 156/56 X |

FOREIGN PATENT DOCUMENTS 599097  3/1946  United Kingdom .

*Primary Examiner*—Thurman K. Page
*Attorney, Agent, or Firm*—Harry J. Gwinnell

[57] ABSTRACT

Magnet wire insulated with dielectric tape material of polyester overwrapped with aromatic polyamide is described. The tape can be spirally wrapped at high speeds onto the magnet wire substrate. The initial layer of polyester provides secure bonding of the subsequently wrapped polyamide layer. The wire is particularly useful in environments where abrasion resistant, high temperature stable magnet wire is needed which is capable of submersive use in oil and maintains its integrity when exposed to other corrosive environments.

1 Claim, No Drawings

POLYESTER-POLYAMIDE TAPE INSULATED MAGNET WIRE AND METHOD OF MAKING THE SAME

TECHNICAL FIELD

The field of art to which this invention pertains is insulated electrical conductors, and specifically insulated magnet wire and methods of making the same.

BACKGROUND ART

Insulated magnet wires are primarily used to form coils that create magnet fields within motors and other kinds of electrical devices. For most uses, thermally stable coatings of polymer insulation are applied to electrical conductors for adequate dielectric properties with good durability. Sometimes the polymeric insulation is not sufficient to provide correct dielectric distance between windings of the coil or the insulation may not be durable enough to withstand coil forming or final environment in which the coils must reside. For example, coils may be submerged in oils or other coolant liquid when in final coil use that may degrade or dissolve polymeric materials. Because of the many variables and properties that a coil must be constructed for, numerous insulation materials must be used to adequately provide electrical properties while withstanding coil forming processing conditions as well as final coil environments. There is a constant search for combinations of materials which can meet all of these needs.

Accordingly, what is needed in this art is an improved insulation material for magnet wire substrates which can withstand the riggers of coil formation as well as having acceptable properties for the various environments such wires will be used in.

DISCLOSURE OF INVENTION

The present invention is directed to a high speed method of making insulated magnet wire by first spirally wrapping a layer of polyester tape material on the magnet wire substrate. On top of this wrapped polyester tape material is overwrapped a layer of aromatic polyamide tape. The thus wrapped magnet wire substrate is then subject to induction heating which causes the tape material to melt and bond together on the magnet wire substrate. The resultant product is not only abrasion resistant and high temperature stable but is capable of withstanding corrosive environments as well.

The product produced by such process is also described.

The foregoing and other features and advantages of the present invention will become more apparent from the following description.

BEST MODE FOR CARRYING OUT THE INVENTION

The electrical conductors to be insulated with the tape are conventional conductors in this art and can be either circular, square or rectangular in cross section and may be hollow or solid wire conductors. Typically conductors of circular cross section are insulated with the tape material of the present invention. The wire is generally copper or aluminum and ranges anywhere from 2 mils to 128 mils in diameter, with wires 10 mils to 64 mils being the most commonly treated wires according to the present invention. Typically for circular cross-section wire 14 gauge to 1/0 gauge is used, for square cross section wire 14 gauge to 1/0 gauge wire is used, and for rectangular cross-section wire, wire 50 to 250 mils thick by 75 to 600 mils wide is used. And while the wires are typically bare, i.e. no prior applied insulation material, wires with conventional insulation polymeric coats already applied can also be formed according to the present invention.

Any polyester material with the requisite high temperature stability can be used in the tape material according to the present invention. The polyester material is typically of a linear thermoplastic type with minimal creep resistance, high glass transition and flow temperatures, and relatively high molecular weights. Dacron ® (E.I.DuPont deNemours & Co.) film of the oriented or the nonoriented type and Mylar ® film '(DuPont) (or similar polyester film from Monsanto) have been found to be particularly useful. These films are typically used in thicknesses ranging from 0.001 inch to 0.0015 inch. The tape material is of relatively narrow width and although tape material anywhere from ⅜ inch to 1.0 inch wide can be used, typically tape material ⅜ inch to ⅝ inch wide is used. For example, for a 6 AWG (American Wire Gauge) wire, tape about 0.5 inch in width is typically used. When the tape is spirally wrapped it is abutted or sufficiently overlapped so that there is no exposed conductor after heating to fuse the polyester material. While the polyester tape is typically wrapped in an abutting fashion with no overlap, it may be overlapped and if so typically overlaps about 40% to about 60% of the previously wrapped layer, and preferably about 50% overlap.

While any high temperature stable aromatic polyamide tape can be used as the overwrap material Nomex ® polyamide (DuPont) is preferred. This material is particularly preferred for its high dielectric strength and high thermal stability. The widths useful for the polyamide tape material are the same as that described for the polyester material above. The particular thickness of the polyamide tape typically varies from about 0.5 mil to about 10 mils in actual use depending on the spacing requirements of the final coil, i.e. turn to turn wire spacing. And as with the polyester tape material, either abutting wrap or overlapping wrap can be used. Preferably, overlapping wrap is used with the subsequently wrapped layer overlapping the previously wrapped layer by 40% to 60% and typically about 50%.

The apparatus for the high speed spiral wrapping is that conventionally used in this art. This is the typical machinery used in the industry for spiral wrapping of tape material onto conductors such as machinery provided by U.S. Machinery Corporation, North Billerica, Mass. With the tape material according to the present invention line speeds in excess of forty feet per minute can be used, and typically line speeds greater than fifty feet per minute are used depending on the particular wire size, tape size, etc. In fact, speeds in excess of one hundred feet per minute, e.g. one hundred and twenty feet per minute, have been attained with the process of the present invention.

Once the insulation materials are wrapped tightly around the magnet wire conductor substrate, the wire is passed through conventional induction heating equipment, such as manufactured by the Lepel Corporation of New York, so as to raise the temperature of the conductor to the melt point of the polyester tape material. The polyester material is raised to a temperature sufficient to melt the polyester just above the glass transition temperature of the polyester which is typically about 200° C., enough to adhere to the conductor substrate and the polyamide outer layer of insulation material. Immediately after the wire reaches this melt temperature and the polyester material bonds to the conductor and the polyamide overwrap, the wire is cooled to room temperature before takeup onto spools, reels or other forms of packaging.

The cooling is typically done by air cooling using various lengths of line prior to wrapping, although forced air or other forms of cooling may be used.

The respective thicknesses of the various layers can be controlled either by the thickness or width of the tape, degree of overlap or number of overlap wraps. Typically the thickness of the polyester layer will vary from 0.5 mil to 1.5 mils and thickness of the polyamide layer will vary from 1.0 mil to 10.0 mils. As stated above, this thickness can be controlled either by the single thickness of the tape or using thinner tapes and overlapping to attain these thickness.

EXAMPLE

A 6 AWG magnet wire substrate (copper) was spirally wrapped in abutting fashion using conventional spiral wrapping apparatus at a speed of 50 feet per minute with a polyester tape material 0.5 inch wide and 0.005 inch thick. Immediately after wrapping the polyester material onto the magnet wire substrate an aromatic polyamide tape was wrapped on top of the polyester tape material. The polyamide tape material was overlapped onto approximately 50% of the previously applied polyamide layer. The polyamide material was 0.5 inch wide and 0.015 inch thick and also wrapped at a speed of 50 feet per minute (linear feet of conductor). Immediately after wrapping, the wrapped conductor was passed through a Lepel induction heater which raised the temperature of the copper wire to approximately 200° C., for 10 seconds which allowed the polyester material to just reach its melt temperature and bond the overwrapped polyamide to the magnet wire substrate through the melted and resolidified polyester. Testing of the subsequently wrapped article indicated that the dielectric strength exceeded the minimum NEMA (National Electrical Manufacturers Association) specification of 90 volts/mil insulation thickness. In addition the material was capable of being immersed in hot oil without deterioration.

The advantages of magnet wire made according to the present invention includes improved abrasion resistance, integrity during coil winding, and improved stability during oil immersion and other environments such as cooling liquids. The material has particular application where strength and abrasion resistance in addition to integrity under coil wrapping and corrosive environments is necessary. Heavy transformer and motor applications are some examples of such use. In addition to the above advantages, when the insulation material is stripped from the wire conductor during coil connection or when attaching lead wires, the insulation adheres to the conductor without fraying which is not the case, for example, with unbonded polyamide type insulated wire. Such fraying can cause serious coil insertion problems.

Although the invention has been shown and described with respect with detailed embodiments thereof, it will be understood by those skilled in the art that various changes in form and detail thereof may be made without departing from the spirit and scope of the invention.

We claim:

1. A method of making insulated magnet wire comprising high speed spirally wrapping a layer of polyester tape onto a magnet wire substrate, high speed spirally overwrapping a layer of aromatic polyamide tape on the polyester tape, induction heating the wrapped magnet wire substrate to a temperature sufficient to bond the tape materials to the magnet wire substrate, resulting in an abrasion resistant, non-fraying, oil resistant, coolant resistant, high temperature stable magnet wire.

* * * * *